United States Patent [19]
Sasaki et al.

[11] Patent Number: 5,817,214
[45] Date of Patent: Oct. 6, 1998

[54] ROSIN EMULSION SIZING AGENT FOR PAPER MAKING AND METHOD FOR PAPER SIZING USING THE SAME

[75] Inventors: Yoshihiro Sasaki; Nobuyuki Tani; Daijiro Arai, all of Osaka, Japan

[73] Assignee: Arakawa Kagaku Kogyo Kabushiki Kaisha, Osaka, Japan

[21] Appl. No.: 750,044

[22] PCT Filed: Apr. 1, 1996

[86] PCT No.: PCT/JP96/00900

§ 371 Date: Nov. 29, 1996

§ 102(e) Date: Nov. 29, 1996

[87] PCT Pub. No.: WO96/31648

PCT Pub. Date: Oct. 10, 1996

[30] Foreign Application Priority Data

Apr. 3, 1995 [JP] Japan ................................. 7-102999
Jun. 29, 1995 [JP] Japan ................................. 7-188035

[51] Int. Cl.$^6$ ................................................. D21H 17/62
[52] U.S. Cl. ................... 162/180; 162/168.6; 162/168.3; 106/236; 106/218; 524/272
[58] Field of Search ................................. 162/180, 168.3, 162/168.6; 106/218, 236, 238; 524/272, 274; 252/311, 312, 314, 356, 357

[56] References Cited

U.S. PATENT DOCUMENTS

| | | | |
|---|---|---|---|
| 3,702,799 | 11/1972 | Lewis et al. | 162/168.6 X |
| 3,966,654 | 6/1976 | Aldrich | 162/180 X |
| 4,469,611 | 9/1984 | Snyder, Jr. et al. | 252/75 |
| 5,367,009 | 11/1994 | Inoue et al. | 524/272 |
| 5,393,337 | 2/1995 | Nakamura et al. | 106/238 |

FOREIGN PATENT DOCUMENTS

| | | |
|---|---|---|
| 1-189343 A | 7/1989 | Japan . |
| 3-40893 A | 2/1991 | Japan . |

*Primary Examiner*—Stanley S. Silverman
*Assistant Examiner*—Jose S. Fortuna
*Attorney, Agent, or Firm*—Kubovcik & Kubovcik

[57] ABSTRACT

A rosin emulsion sizing agent for paper making comprising a rosin substance, a dispersing agent and water, the rosin substance comprising (a) a rosin or a fortified rosin and (b) a rosin ester or a fortified rosin ester, the dispersing agent comprising a (meth)acrylamide copolymer obtained by polymerizing a polymerizable monomer mixture containing (A) 70 to 95% by mole of (meth)acrylamide, (B) 0.5 to 10% by mole of a sulfo (salt) group-containing monomer or a phosphoric acid (salt) group-containing monomer and (C) 1 to 20% by mole of a hydrophobic monomer, and a method for paper sizing using the same.

10 Claims, No Drawings

ROSIN EMULSION SIZING AGENT FOR PAPER MAKING AND METHOD FOR PAPER SIZING USING THE SAME

This application is a 371 of PCT/JP96/00900 filed on Apr. 1, 1996.

1. Technical Field

The present invention relates to a rosin emulsion sizing agent for paper making and a method for paper sizing using the same.

2. Background Art

In recent years, as a sizing agent for paper making, on the basis of the request for closing a paper making system and the like, the use of a rosin emulsion type sizing agent becomes to be the main current. Also, in consideration of an evil influence in paper making under an acidic condition, such as deterioration of paper machines, among the rosin emulsion type sizing agents, a rosin emulsion type sizing agent having excellent sizing property in the neutral range is required. Also, as a dispersing agent used for the emulsion type sizing agent, as usual, from the viewpoint of fixing property, an anionic dispersing agent is used because cationized starch, a cationic polymer or the like is used as a fixing agent for a sizing agent.

As the dispersing agent, for instance, low molecular weight surface active agents such as sodium alkylsulfate, sodium alkylbenzenesulfonate and sulfuric acid ester salt of polyoxyethylene alkylphenyl ether are known. However, because the low molecular weight surface active agent largely foams during paper making, a polymer type dispersing agent which slightly foams has been used in recent years.

As the polymer type dispersing agent, for instance, in Japanese Unexamined Patent Publication No. 203031/1989 and the like, there is proposed an anionic copolymer obtained from a hydrophobic monomer such as styrene and hydrophilic monomers such as an acrylic acid type monomer and a sulfonic acid type monomer, which are main components. However, the copolymer described in the publication becomes insoluble owing to the reciprocal action on cationic chemicals such as alum not fixed with pulp and cationized starch when the amount of the hydrophobic monomer is large. As a result, emulsion is broken and aggregate is generated, and then this causes machine troubles. Conversely, when the amount of the hydrophobic monomer is small, that is, the amount of the acrylic acid type monomer having a carboxylic acid which is a weak acid becomes large, dilution stability in hard water becomes insufficient. On the contrary, when the amount of the sulfonic acid type monomer which is a strong acid becomes large, the emulsion is stably dispersed in hard water, however, aggregation force becomes strong, and as a result, because distribution of a sizing agent to papers becomes ununiform, sizing effect is lowered.

Additionally, in Japanese Unexamined Patent Publication No. 169898/1981, there is proposed emulsion obtained by using a fortified rosin as a rosin substance and using a denatured polyacrylamide as a dispersing agent. However, in the neutral range of at least pH 6, solubility in water becomes high based on dissociation of a carboxylic acid in the fortified rosin, and fixing property with pulp is lowered. Accordingly, sizing property in the neutral range cannot be sufficiently improved.

The present invention aims at providing a rosin emulsion sizing agent for paper making in which there is used a polymer type dispersing agent which is excellent in mechanical stability, hardly generates aggregate based on the reciprocal action on alum not fixed with pulp or other cationic chemicals and is excellent in stability in hard water, and furthermore, the sizing agent being excellent in sizing property (in particular, sizing property in the neutral range), and a method for paper sizing using the same.

The present inventors have earnestly studied in order to accomplish the above-mentioned object. As a result, it was found that, for the first time, there could be obtained a rosin emulsion sizing agent for paper making agreeing to the above-mentioned object, by using a specific rosin substance containing a rosin ester and the like, as a rosin substance, and combining a copolymer as a dispersing agent for the specific rosin substance, obtained from specific components composed of a hydrophilic (meth)acrylamide as a main component and a sulfo (salt) group-containing or phosphoric acid (salt) group-containing monomer as an essentially anionic component, which is a stronger acid than a carboxyl group (acrylic acid and the like), with the specific rosin substance. The present invention has been accomplished based on this novel knowledge.

DISCLOSURE OF INVENTION

The present invention relates to

① A rosin emulsion sizing agent for paper making comprising a rosin substance, a dispersing agent and water, the rosin substance comprising (a) a rosin or a fortified rosin and (b) a rosin ester or a fortified rosin ester, the dispersing agent comprising a (meth)acrylamide copolymer obtained by polymerizing a polymerizable monomer mixture containing (A) 70 to 95% by mole of (meth)acrylamide, (B) 0.5 to 10% by mole of a sulfo (salt) group-containing monomer or a phosphoric acid (salt) group-containing monomer and (C) 1 to 20% by mole of a hydrophobic monomer, ② a rosin emulsion sizing agent for paper making prepared by mixing at most 500 parts by weight of a polyvalent metal salt, on a solid basis, with 100 parts by weight of solid matter of the rosin emulsion sizing agent for paper making, ③ a method for paper sizing characterized by using the above-mentioned rosin emulsion sizing agent for paper making in the range of pH 6 to 8, and ④ a method for paper sizing characterized by mixing the above-mentioned rosin emulsion sizing agent for paper making with a polyvalent metal salt just before the addition to a paper making system and using them in the range of pH 6 to 8.

BEST MODE FOR CARRYING OUT THE INVENTION

A disperse phase in the rosin emulsion sizing agent for paper making of the present invention is composed of a rosin substance comprising (a) a rosin or a fortified rosin and (b) a rosin ester or a fortified rosin ester.

As the rosin (a), there are cited gum rosin, wood rosin, tall oil rosin and the like. As the rosin, hydrogenated rosin, disproportioned rosin, polymerized rosin, aldehyde-denatured rosin and the like, which are denatured substances thereof, may be partially used therewith.

Also, the fortified rosin is a rosin obtained by partially denaturing the above-mentioned rosin with a α,β-unsaturated carboxylic acid or the like. Accordingly, in the fortified rosin, in addition to α,β-unsaturated carboxylic acid-denatured rosin, non-reacted rosin is contained. As the α,β-unsaturated carboxylic acid or the like, there can be exemplified maleic anhydride, maleic acid, maleic acid monoester or maleic acid diester, which is obtained from lower alcohol and maleic anhydride, fumaric acid, a N-alkylmaleimide, itaconic acid, itaconic anhydride, acrylic acid and the like. Among them, maleic anhydride, maleic acid, maleic acid monoester, fumaric acid, itaconic acid and itaconic anhydride are preferable. It is desired that the amount of the α,β-unsaturated carboxylic acid is, as usual, at most 1 mole, preferably 0.05 to 0.75 mole or so, particularly preferably 0.10 to 0.70 mole or so based on 1 mole of the rosin. It is desired that denaturation reaction is carried out, as usual, at the temperature of 150° to 300° C. or so for 0.5 to 24 hours or so.

The rosin ester (b) is prepared from the rosin and polyvalent alcohol by means of a publicly known esterification method. Usually, after both compounds are charged, the dehydration condensation is carried out with stirring under ordinary pressure, reduced pressure or application of pressure, according to the boiling point of the polyvalent alcohol, at a temperature of 150° to 300° C. or so for 3 to 40 hours or so. Also, during the reaction, if necessary, the dehydration condensation can be carried out under azeotropy by using a solvent such as benzene, toluene or xylene.

As the above-mentioned polyvalent alcohol, various publicly known alcohol can be used, and trivalent alcohol and tetravalent alcohol are preferable. As the trivalent alcohol, there are cited, for instance, glycerin, trimethylolpropane, trimethylolethane, 3-methylpentane-1,3,5-triol and the like. As the tetravalent alcohol, there are cited, for instance, pentaerythritol, diglycerin and the like. Also, there can be used aminoalcohol such as triethanolamine or triisopropanolamine and the like. These polyvalent alcohol can be used with one member or at least two members.

Moreover, as to the ratio of the above-mentioned rosin to the polyvalent alcohol, it is desired that the equivalent ratio of hydroxyl group in the polyvalent alcohol to carboxyl group in the rosin [—OH(eq)/—COOH(eq)] is, as usual, within the range of 0.1 to 1.5, preferably 0.1 to 1.0, and as the rosin ester, a completely esterified substance can be prepared, and furthermore, a rosin ester containing non-reacted rosin can be also prepared. It is not desired that the above-mentioned equivalent ratio is less than 0.1 because there is a tendency that the amount of the rosin ester becomes small, so that the improvement of sizing effect of the obtained sizing agent in the neutral range becomes insufficient. Also, it is not desired that the equivalent ratio is more than 1.5 because there is a tendency that sizing effect is lowered owing to a residual hydroxyl group when it is used as a sizing agent since many residual hydroxyl groups remain in the resulting rosin ester.

Also, the fortified rosin ester is prepared by reacting the rosin with the polyvalent alcohol, the α,β-unsaturated carboxylic acid and the like successively or at the same time. Successive reaction means that after the rosin is reacted with the polyvalent alcohol, the α,β-unsaturated carboxylic acid and the like may be reacted therewith, and that after the rosin is reacted with the α,β-unsaturated carboxylic acid and the like, the polyvalent alcohol may be reacted therewith. The esterification reaction with the polyvalent alcohol and the denaturation reaction with the α,β-unsaturated carboxylic acid and the like may be carried out in the same manner as mentioned above.

Sizing effect in the neutral range is improved by using the rosin ester or fortified rosin ester (b) in addition to the above-mentioned rosin or fortified rosin (a), as the rosin substance in the present invention. Therefore, it is desired that the content of the rosin ester or fortified rosin ester (b) in the rosin substance is 20 to 90% by weight. When the content of the rosin ester or fortified rosin ester (b) is less than 20% by weight, there is a tendency that the improvement of sizing effect in the neutral range becomes insufficient, and when the content of the rosin ester or fortified rosin ester (b) is more than 90% by weight, there is a tendency that sizing effect is not characterized.

Moreover, the rosin substance in the present invention can be prepared by separately preparing the rosin or fortified rosin (a) and the rosin ester or fortified rosin ester (b), respectively, and then mixing them together with, and in addition, as a result of the preparation of the rosin ester or fortified rosin ester (b), when the above-mentioned rosin or fortified rosin (a) and the rosin ester or fortified rosin ester (b) are contained in the obtained reaction product, the reaction product can be also used as a rosin substance as it is in the present invention. For instance, as a result of the preparation of the rosin ester as the rosin ester or fortified rosin ester (b), when a reaction product contains non-reacted rosin in a prescribed amount in addition to the rosin ester, the reaction product can be used as the rosin substance in the present invention.

In the present invention, so far as a rosin substance is the above-mentioned prescribed rosin substance, this can be used as it is as a disperse phase of emulsion.

In the present invention, as a dispersing agent for the above-mentioned prescribed rosin substance, there is used a (meth)acrylamide copolymer obtained by polymerizing a polymerizable monomer mixture containing (A) 70 to 95% by mole of (meth)acrylamide, (B) 0.5 to 10% by mole of a sulfo (salt) group-containing monomer or a phosphoric acid (salt) group-containing monomer and (C) 1 to 20% by mole of a hydrophobic monomer.

The (meth)acrylamides (A) are acrylamide and/or methacrylamide. Hereinafter, the term "(meth)" means as the same. The (meth)acrylamide (A) is used for imparting hydrophilic property to the dispersing agent, and its amount is 70 to 95% by mole, preferably 75 to 90% by mole of the total moles of the polymerizable monomer mixture (monomers) used for preparing the (meth)acrylamide copolymer which is the dispersing agent. When the amount of the (meth)acrylamide (A) is less than 70% by mole, fixing property of the obtained emulsion sizing agent with pulp is lowered and mechanical stability is also lowered, and also, when the amount is more than 95% by mole, emulsification stability of the emulsion becomes poor.

The sulfo (salt) group-containing monomer or phosphoric acid (salt) group-containing monomer (B) is used for imparting anionic property to the dispersing agent, and its amount is 0.5 to 10% by mole, preferably 1 to 5% by mole of the total moles of the polymerizable monomer mixture (monomers) used for preparing the (meth)acrylamide copolymer which is the dispersing agent. Moreover, even if there is used (meth)acrylic acid as a substitute, which is a carboxyl group-containing monomer and is a weaker acid compared to the sulfo (salt) group-containing monomer or the phosphoric acid (salt) group-containing monomer, dilution stability in hard water cannot be improved. That is, in the present invention, there is used the sulfo (salt) group-containing monomer or the phosphoric acid (salt) group-containing monomer as an anionic component in the dispersing agent, which is a relatively strong acid, accordingly, poorness of dilution stability in hard water of emulsion, which generates when the carboxyl group-containing monomer is used, has been improved. When the amount of the sulfo (salt) group-containing monomer or phosphoric acid (salt) group-containing monomer (B) is less than 0.5% by mole, fixing of the sizing agent is lowered owing to the lowering of anionic property, and also, when the amount is more than 10% by mole, aggregation force becomes strong, distribution of the sizing agent to papers becomes ununiform and sizing effect is lowered.

As the sulfo (salt) group-containing monomer, there are cited, for instance, a sulfonic acid (salt) type monomer such as styrenesulfonic acid (salt), vinyl sulfonic acid (salt), 2-(meth)acrylamido-2-methylpropane sulfonic acid (salt), sulfoethyl (meth)acrylate (salt), sulfopropyl (meth)acrylate (salt) or (meth)allyl sulfonic acid (salt) and/or a sulfuric acid ester type monomer such as sulfuric acid ester (salt) of hydroxyethyl (meth)acrylate, sulfuric acid ester (salt) of hydroxypropyl (meth)acrylate, sulfuric acid ester (salt) of polyoxyalkylene (meth)acrylate or sulfuric acid ester (salt) of polyoxyethylene alkylpropenyl ether. Also, as the phosphoric acid (salt) group-containing monomer, there are cited, for instance, acid phosphooxyethyl (meth)acrylate, acid phosphooxypropyl (meth)acrylate, acid phosphooxypolyethylene glycol (meth)acrylate and the like. Moreover, the above-mentioned term "(salt)" means that sulfo group or phosphoric acid group may form a salt such as an alkaline metal salt such as sodium salt or potassium salt, or ammonium salt. Hereinafter, the term "(salt)" means as the same. These sulfo (salt) group-containing monomers or phosphoric acid (salt) group-containing monomers can be used alone or by combining at least two members together with.

The hydrophobic monomer (C) is used for imparting hydrophobic property to the dispersing agent, and its amount is 1 to 20% by mole, preferably 1 to 15% by mole of the total moles of the polymerizable monomer mixture (monomers) used for preparing the (meth)acrylamide copolymer which is the dispersing agent. When the amount of the hydrophobic monomer (C) is less than 1% by mole, emulsification stability becomes poor, and also, when the amount is more than 20% by mole, aggregation property becomes strong, accordingly, both cases are not preferable.

As the hydrophobic monomer (C), there can be exemplified (meth)acrylic acid ester which has an alkyl group having 1 to 20 carbon atoms, such as ethyl (meth)acrylate, methyl (meth)acrylate or butyl (meth)acrylate, a styrene type monomer such as a styrene group such as styrene or α-methylstyrene, or a styrene compound which has an alkyl group having 1 to 4 carbon atoms in an aromatic ring of the styrene group, carboxylic acid vinyl ester such as vinyl acetate or vinyl propionate, α-olefin having 6 to 22 carbon atoms, alkyl vinyl ether having 1 to 22 carbon atoms, vinylpyrrolidone, and the like. Among them, from the viewpoint of emulsification property, (meth)acrylic acid ester, styrene type monomer, carboxylic acid vinyl ester and the like are particularly preferable.

Also, as the above-mentioned (meth)acrylamide copolymer which is the dispersing agent, in order to improve emulsification property, there can be used a copolymer obtained by polymerizing a polymerizable monomer mixture (monomers) containing (D) carboxyl (salt) group-containing monomer in an amount of the range of at most 5% by mole, preferably at most 4% by mole of the total moles. It is not desired that the amount of the carboxyl (salt) group-containing monomer (D) is more than 5% by mole because dilution stability in hard water is lowered.

As the carboxyl (salt) group-containing monomer (D), there are cited, for instance, (meth)acrylic acid (salt), a maleic acid type monomer such as maleic acid (salt), maleic anhydride or maleic acid monoester, a fumaric acid type monomer such as fumaric acid (salt) or fumaric acid monoester and the like. Among them, (meth)acrylic acid (salt) is preferable.

Furthermore, as the above-mentioned (meth)acrylamide copolymer which is the dispersing agent, there can be used a copolymer obtained by polymerizing a polymerizable monomer mixture (monomers) containing (E) hydrophilic monomer other than (A) (meth)acrylamide in an amount of the range of at most 20% by mole of the total moles.

As the above-mentioned hydrophilic monomer, there are cited, for instance, a nitrile type monomer such as (meth) acrylonitrile; a hydroxyl group-containing monomer such as hydroxyethyl (meth)acrylate, hydroxypropyl (meth) acrylate, hydroxybutyl (meth)acrylate, glycerin mono(meth) acrylate, glycerin di(meth)acrylate, pentaerythritol mono (meth)acrylate, pentaerythritol (meth)acrylate or (meth)allyl alcohol; a polyoxyalkylene group-containing monomer such as polyoxyalkylene (meth)acrylic acid ester, polyoxyalkylene glycerin (meth)acrylic acid ester, polyoxyalkylene monoalkyl (meth)acrylic acid ester, polyoxyalkylene (meth) allyl ether or polyoxyalkylene glycerin (meth)allyl ether; and the like.

As a process for preparing a copolymer which is the dispersing agent used in the present invention, for instance, various publicly known methods such as a solution polymerization method, an emulsion polymerization method and a suspension polymerization method can be employed and a copolymer is easily prepared by polymerizing the above-mentioned polymerizable monomer mixture. When the solution polymerization method is employed, solvents such as isopropyl alcohol, ethyl alcohol and methyl isobutyl ketone can be used. An emulsifying agent used in the emulsion polymerization method is not particularly limited, and various surface active agents can be used. As an anionic surface active agent, there can be exemplified, for instance, dialkyl sulfosuccinate, alkane sulfonate, α-olefin sulfonate, polyoxyethylene alkyl ether sulfosuccinate, polyoxyethylene styrylphenyl ether sulfosuccinate, naphthalenesulfonic acid-formalin condensate, polyoxyethylene alkyl ether sulfate, polyoxyethylene alkylphenyl ether sulfate and the like. As a nonionic surface active agent, there can be exemplified, for instance, polyoxyethylene alkyl ether, polyoxyethylene styrylphenyl ether, polyoxyethylene sorbitan fatty acid ester, reactive surface active agents obtained by introducing vinyl group or allyl group, and propenyl group into these surface active agents, and the like. These surface active agents can be used by appropriately selecting one member or at least two members, and it is desired that its amount is, as usual, 0.1 to 10% by weight or so based on the total amount of the polymerizable monomer mixture (monomers). Also, a polymerization initiator used in the above-mentioned polymerization is not particularly limited, and various compounds such as persulfuric acid salts, peroxides, azo compounds and redox initiators can be used. Furthermore, in order to control the molecular weight, there can be also appropriately used publicly known chain-transfer agents such as isopropyl alcohol, tetrachlorocarbon, ethylbenzene, isopropylbenzene, cumene, thioglycolic acid ester, alkylmercaptan and 2,4-diphenyl-4-methyl-1-pentene.

It is desired that the weight average molecular weight of the obtained (meth)acrylamide copolymer which is the dispersing agent is, as usual, 1,000 to 200,000, preferably 1,000 to 100,000 because it directly correlates with dispersive power of the rosin substance (reaction product). When the weight average molecular weight is less than 1,000, there is a tendency that mechanical stability of the emulsion becomes poor, and also, when the weight average molecular weight is more than 200,000, there is a tendency that viscosity of a product becomes high. Moreover, the copolymer is usually water soluble, however, it may show water dispersibility.

The rosin emulsion sizing agent for paper making of the present invention can be prepared by using the rosin substance and the (meth)acrylamide copolymer which is the dispersing agent, obtained as above, according to publicly known methods, for instance, described in Japanese Examined Patent Publication No. 4866/1978 (melting high-pressure emulsifying method), Japanese Examined Patent Publication No. 22090/1978 (solvent high-pressure emulsifying method), Japanese Unexamined Patent Publication No. 77206/1977 and Japanese Examined Patent Publication No. 4938/1983 (inversion emulsifying method) and the like.

For instance, when the solvent high-pressure emulsifying method is employed, to the rosin substance previously dissolved in a water-insoluble organic solvent are added the above-mentioned (meth)acrylamide copolymer which is the dispersing agent, water and, as occasion demands, an alkaline substance such as sodium hydroxide, potassium hydroxide, ammonia or a lower amine, and they are emulsified by passing through a homogenizer, a piston type high pressure emulsifier, a supersonic emulsifier or the like, and then, the above-mentioned organic solvent is distilled away. Moreover, the time for addition of the copolymer is not particularly limited, and when the emulsification is carried out by using a small amount of an alkali or a surface active agent, the addition may be carried out after emulsifying by an emulsifier or after distilling away the solvent, and excellent aqueous emulsion can be obtained in both cases.

Also, when the inversion emulsifying method is employed, a molten rosin substance is prepared by heating the rosin substance, as usual, to 90° to 160° C. with stirring. And then, an aqueous solution of the above-mentioned copolymer or the aqueous emulsion and hot water in a prescribed amount are added to the molten rosin substance with stirring to conduct the phase inversion, and emulsion in which the rosin substance is a disperse phase and water is a continuous phase is prepared.

In the above-mentioned solvent high-pressure emulsifying method and inversion emulsifying method, it is desired that the amount of the above-mentioned copolymer which is the dispersing agent is, as usual, within the range of 1 to 30 parts by weight, preferably 2 to 20 parts by weight, on dry weight basis, based on 100 parts by weight of the rosin substance. When the amount of the copolymer is less than 1 part by weight, there is a tendency that dispersion force becomes insufficient, and also, there is a tendency that it becomes not economical to use the copolymer in an amount of more than 30 parts by weight. Moreover, in compliance with request, the pH of the obtained emulsion can be adjusted by diluting with water or alkaline water.

Also, in the above-mentioned solvent high-pressure emulsifying method and inversion emulsifying method, a surface active agent can be added to the above-mentioned copolymer to the extent that bad influence is not given on foaming property and sizing effect. As the surface active agent, various surface active agents usable in the emulsion polymerization method of copolymer can be exemplified.

The thus obtained rosin emulsion sizing agent for paper making of the present invention is aqueous emulsion usually having preferably 10 to 70% by weight, more preferably 30 to 55% by weight of solid matter, in which the rosin substance is uniformly dispersed as particles having average particle diameter of at most 1 μm. The aqueous emulsion shows an opal appearance and usually has the pH of 2.0 to 7.5. Also, the aqueous emulsion is stable at room temperature for at least 6 months and does not precipitate. Also, since the aqueous emulsion is excellent in dilution stability in hard water, it can be sufficiently diluted by using water from rivers, city water, wells or the like, and is well dispersed in aqueous dispersion of pulp, and further, its diluted solution is stable for a long period of time and has extremely low foaming property. Furthermore, as shown in the following examples, the aqueous emulsion is good in mechanical stability.

The rosin emulsion sizing agent for paper making of the present invention can be preferably used, for instance, in a method comprising adding this together with a fixing agent such as aluminum sulfate to aqueous dispersion of pulp and sizing at pH 4 to 8 or a method comprising adding this together with a cationic fixing agent and the like to aqueous dispersion of pulp and making paper at pH 4 to 8, and can impart excellent sizing effect to manufactured paper under a wide pH range for paper making. The rosin emulsion sizing agent for paper making is particularly excellent in sizing effect under the neutral range (pH 6 to 8). When fillers are used, an inorganic filler such as silicic acid salts such as talc, clay and kaolin, titanium dioxide or calcium carbonate, and an organic filler such as urea-formalin may be used alone or together with each other. In this case, it is desired that the rosin emulsion sizing agent for paper making is usually used in an amount of 0.05 to 3% by weight or so for the pulp (dry weight basis). Also, since the sizing agent of the present invention is excellent in fixing property with pulp, the amount of aluminum sulfate or the like can be lowered. Furthermore, sizing effect of the sizing agent of the present invention is never lowered even in the paper making at high temperature, even though hardness of water becomes high, or even though the amount of impure substances is increased with the closing due to the use of waste paper and the like.

Therefore, when a method for paper sizing of the present invention, which is characterized by using the above-mentioned rosin emulsion sizing agent for paper making in the range of pH 6 to 8 is employed, particularly excellent sizing effect is exhibited and workability during the paper making is improved.

According to the present invention, as the rosin emulsion sizing agent for paper making, there is provided a sizing agent prepared by further mixing a polyvalent metal salt with the rosin emulsion sizing agent for paper making prepared from the above-mentioned specific rosin substance and the specific copolymer which is the dispersing agent. When a polyvalent metal salt used as a fixing agent is mixed with a rosin emulsion sizing agent for paper making, as usual, the agent cannot be preserved for a long period of time because aggregation of emulsion particles generates. However, the rosin emulsion sizing agent for paper making of the present invention, which is prepared from the above-mentioned specific rosin substance and the specific copolymer which is the dispersing agent, does not generate aggregation of the emulsion particles even in the case that the polyvalent metal salt is previously mixed therewith. Therefore, even in the case that the concentration of solid matter of the emulsion is adjusted to 10 to 50% by weight, excellent mixing stability with a polyvalent metal salt is exhibited for a long period of time.

As the polyvalent metal salt, those usually used as a fixing agent for the sizing agent can be used, and there are cited, for instance, aluminum sulfate, aluminum chloride, poly(aluminum hydroxide), poly(aluminum chloride) and the like. The amount of the polyvalent metal salt is at most 500 parts by weight, on a solid basis, based on 100 parts by weight of solid matter of the rosin emulsion sizing agent for paper making prepared from the above-mentioned specific rosin substance and the specific copolymer which is the dispersing agent. When the amount of the polyvalent metal salt is more than 500 parts by weight, it becomes impossible to carry out the preservation for a long period of time due to aggregation of the emulsion particles.

A method for mixing the polyvalent metal salt with the rosin emulsion sizing agent for paper making is not particularly limited, and the polyvalent matal salt may be mixed therewith at the emulsifying stage in the preparation of the rosin emulsion sizing agent for paper making, and may be mixed therewith after the preparation of the rosin emulsion sizing agent for paper making. Also, the mixing of the rosin emulsion sizing agent for paper making with the polyvalent metal salt may be carried out just before the addition to a paper making system.

The thus obtained rosin emulsion sizing agent for paper making containing the polyvalent metal salt has excellent properties such as dilution stability in hard water and mechanical stability as well as the rosin emulsion sizing agents for paper making not containing the above-mentioned polyvalent metal salt, and can be subjected to the paper making according to the same method for paper sizing as mentioned above, and can impart excellent sizing effect to making paper in a wide pH range for paper making. Also, since the rosin emulsion sizing agent for paper making previously contains the polyvalent metal salt, it can impart excellent sizing effect to manufactured paper even in a paper making system to which the other fixing agent for the sizing agent is not separately added.

Accordingly, when there is employed the method for paper sizing of the present invention, which is characterized by mixing the above-mentioned rosin emulsion sizing agent for paper making with the polyvalent metal salt and using them in the range of pH 6 to 8, extremely excellent sizing effect is exhibited and workability during paper making is improved.

Moreover, base paper to which the rosin emulsion sizing agent for paper making of the present invention is applied is not particularly limited, and the sizing agent can be applied to various papers and paperboards. As the kinds of papers, there are cited, for instance, various papers such as recording papers and base papers therefor such as form paper, PPC paper, ink jet paper, thermal transfer paper, thermosensitive recording base paper and pressure sensitive recording base paper, base papers for coated papers such as art paper, cast-coated paper and fine coated paper, wrapping papers such as kraft paper and pure-white roll paper, notebook paper, book paper, printing paper, and news print paper; paperboards for carton such as Manila board, white board and chipboard, and paperboard such as liner. Also, it can be effectively utilized for not only the paper making of cellulose fiber but also the preparation of papers, paperboards, fiberboards and the like by carrying out the paper making of a mixture of the fiber with mineral fibers such as asbestos and rock wool or synthetic fibers such as polyamide, polyester and polyolefin. Also, it can be used as a surface sizing agent, and in this case, it is applied to humidified papers previously made according to a customary method such as spraying, dipping or coating.

The rosin emulsion sizing agent for paper making and the method for paper sizing using the same of the present invention are more concretely explained by means of the following Examples and Comparative Examples. Moreover, Reference Examples are Preparation Examples of the rosin substances used in the present invention and Preparation Examples of the acrylamide copolymers which are the dispersing agents. Also, in each example, part(s) and % are shown as weight standard unless otherwise noted.

REFERENCE EXAMPLE 1

(Preparation Example of fortified rosin)

With a 1 L flask equipped with a stirrer, a thermometer, a tube for introducing nitrogen, a water separator and a condenser was charged 100 parts of gum rosin having an acid value of 170, and after they were heated to 160° C. under a nitrogen stream, 8 parts of fumaric acid was added thereto, and they were heated and maintained at 210° C. for 3 hours. The obtained reaction product had a softening point of 117° C. and an acid value of 242.

REFERENCE EXAMPLE 2

(Preparation Example of rosin ester)

With the same reactor as in Reference Example 1 were charged 100 parts of gum rosin having an acid value of 170 and 9.3 parts of glycerin (equivalent ratio (—OH/—COOH) =1.00), and they were heated to 250° C. under a nitrogen stream and esterified at the same temperature for 8 hours to give a rosin ester having a softening point of 84° C. and an acid value of 6.

REFERENCE EXAMPLE 3

(Preparation Example of fortified rosin ester)

After the rosin ester obtained in Reference Example 2 was heated to 160° C., 8.2 parts of maleic anhydride was added thereto and they were heated and maintained at 210° C. for 2 hours to give a reaction product containing a fortified rosin ester having a softening point of 102° C. and an acid value of 183.

REFERENCE EXAMPLE 4

(Preparation Example of rosin ester)

In Reference Example 2, a rosin ester having a softening point of 105° C. and an acid value of 15 was obtained in the same manner as in Reference Example 2 except that 10.3 parts of pentaerythritol (equivalent ratio (—OH/—COOH) =1.00) was used instead of 9.3 parts of glycerin.

REFERENCE EXAMPLE 5

(Preparation Example of rosin ester)

In Reference Example 2, a rosin ester having a softening point of 85° C. and an acid value of 59 was obtained in the same manner as in Reference Example 2 except that the amount of glycerin was changed to 6 parts (equivalent ratio (—OH/—COOH)=0.65).

REFERENCE EXAMPLE 6

(Preparation Example of dispersing agent)

In a reactor equipped with a stirrer, a thermometer, a tube for introducing nitrogen and a condenser were mixed 69.7 parts (80% by mole of the total moles of the polymerizable monomer mixture (monomers), hereinafter referred to as same) of acrylamide, 11.9 parts (5% by mole) of 2-acrylamido-2-methylpropane sulfonic acid, 18.4 parts (15% by mole) of ethyl acrylate, 5 parts of lauryl mercaptan, 5 parts of sodium salt of polyoxyethylene (n=13) dodecylphenyl ether sulfuric acid ester, 2 parts of polyoxyethylene (n=9) oleyl ether, 3 parts of potassium persulfate and 400 parts of ion exchange water together with, and they were heated and reacted at 80° C. for 6 hours to give an aqueous solution of a copolymer. Then, the aqueous solution was cooled, and thereto was added sodium hydroxide in an amount equimolar with 2-acrylamido-2-methylpropane sulfonic acid at 60° C., and they were stirred for 1 hour to give a 15% aqueous solution of a copolymer having a weight average molecular weight of 40,000.

REFERENCE EXAMPLE 7

(Preparation Example of dispersing agent)

In Reference Example 6, a 15% aqueous solution of a copolymer having a weight average molecular weight of 25,000 was obtained by carrying out the reaction in the same manner as in Reference Example 6 except that the same % by mole of ammonium salt of hydroxypropyl methacrylate sulfuric acid ester was used instead of 2-acrylamido-2-methylpropane sulfonic acid.

REFERENCE EXAMPLE 8

(Preparation Example of dispersing agent)

In Reference Example 6, a 15% aqueous solution of a copolymer having a weight average molecular weight of 60,000 was obtained by carrying out the reaction in the same manner as in Reference Example 6 except that 64.9 parts (80% by mole) of acrylamide, 14.6 parts (5% by mole) of ammonium salt of hydroxypropyl methacrylate sulfuric acid ester, 17.5 parts (12% by mole) of butyl methacrylate and 3 parts (3% by mole) of methacrylic acid were used as unsaturated monomers, and that potassium hydroxide was used instead of sodium hydroxide.

REFERENCE EXAMPLE 9

(Preparation Example of dispersing agent)

In Reference Example 6, a 15% aqueous solution of a copolymer having a weight average molecular weight of 30,000 was obtained by carrying out the reaction in the same manner as in Reference Example 6 except that 85.1 parts (90% by mole) of acrylamide, 4.6 parts (2% by mole) of sodium styrene sulfonate, 4.6 parts (4% by mole) of styrene and 5.7 parts (4% by mole) of butyl acrylate were used as unsaturated monomers.

REFERENCE EXAMPLE 10

(Preparation Example of dispersing agent)

With a reactor equipped with a stirrer, a thermometer, a tube for introducing nitrogen and a condenser were charged 300 parts of ion exchange water and 5 parts of sodium salt of polyoxyethylene (n=13) dodecylphenyl ether sulfuric acid ester, and they were stirred under an atmosphere of nitrogen gas. Then, thereto were separately added dropwise a mixture solution of 70.2 parts (78% by mole) of acrylamide, 6.4 parts (3.5% by mole) of sodium allyl sulfonate, 23.4 parts (18.5% by mole) of methyl methacrylate and 5 parts of lauryl mercaptan and an aqueous solution prepared by dissolving 3 parts of potassium persulfate in 50 parts of ion exchange water at 80° C. for 3 hours, and they were reacted together with to give a 20% aqueous solution of a copolymer having a weight average molecular weight of 20,000.

REFERENCE EXAMPLE 11

(Preparation Example of dispersing agent)

With a reactor equipped with a stirrer, a thermometer, a tube for introducing nitrogen and a condenser were charged 230 parts of isopropyl alcohol, 54.6 parts (80% by mole) of acrylamide, 30.6 parts (4% by mole) of ammonium salt of polyoxyethylene alkyl propenyl ether sulfuric acid ester (trade name "HITENOL HS-10", made by DAI-ICHI KOGYO SEIYAKU CO., LTD.), 12 parts (12% by mole) of styrene and 2.8 parts (4% by mole) of acrylic acid, and they were stirred under an atmosphere of nitrogen gas. Then, thereto was added 3 parts of azobisisobutyronitrile as a polymerization initiator, and they were heated to 80° C. and maintained for 4 hours, and after 1 part of azobisisobutyronitrile was further added thereto and they were maintained at the same temperature for 3 hours, 150 parts of ion exchange water was added thereto to distill away isopropyl alcohol. After finishing distilling away, they were cooled, and thereto was added potassium hydroxide in an amount equimolar with acrylic acid at 60° C., and they were stirred for 1 hour to give a 20% aqueous solution of a copolymer having a weight average molecular weight of 50,000.

REFERENCE EXAMPLE 12

(Preparation Example of dispersing agent)

In Reference Example 11, a 20% aqueous solution of a copolymer having a weight average molecular weight of 45,000 was obtained by carrying out the reaction in the same manner as in Reference Example 11 except that the same % by mole of vinyl acetate was used instead of styrene.

REFERENCE EXAMPLE 13

(Preparation Example of comparative dispersing agent)

In Reference Example 6, a 15% aqueous solution of a copolymer having a weight average molecular weight of 40,000 was obtained by carrying out the reaction in the same manner as in Reference Example 6 except that 19.6 parts (25% by mole) of acrylamide, 11.4 parts (5% by mole) of 2-acrylamido-2-methylpropane sulfonic acid, 23.0 parts (20% by mole) of styrene, 22.1 parts (20% by mole) of ethyl acrylate and 23.9 parts (30% by mole) of acrylic acid were used.

REFERENCE EXAMPLE 14

(Preparation Example of comparative dispersing agent)

In Reference Example 6, the reaction was carried out in the same manner as in Reference Example 6 except that 75.3 parts (80% by mole) of methacrylamide, 8.0 parts (15% by mole) of styrene and 16.7 parts (5% by mole) of methacrylic acid were used as unsaturated monomers. After that, they were cooled, and thereto was added potassium hydroxide in an amount equimolar with methacrylic acid at 60° C., and they were stirred for 1 hour to give a 15% dispersion of a copolymer having a weight average molecular weight of 65,000.

REFERENCE EXAMPLE 15

(Preparation Example of comparative dispersing agent)

In Reference Example 6, the reaction was carried out in the same manner as in Reference Example 6 except that 75.3 parts (82% by mole) of acrylamide, 8.0 parts (3% by mole) of sodium styrene sulfonate and 16.7 parts (15% by mole) of methacrylic acid were used as unsaturated monomers. After that, they were cooled, and thereto was added potassium hydroxide in an amount equimolar with methacrylic acid at 60° C. and they were stirred for 1 hour to give a 15% aqueous solution of a copolymer having a weight average molecular weight of 65,000.

REFERENCE EXAMPLE 16

(Preparation Example of comparative dispersing agent)

In Reference Example 11, a 20% aqueous solution of a copolymer having a weight average molecular weight of 55,000 was obtained by carring out the reaction in the same manner as in Reference Example 11 except that 47 parts (70% by mole) of acrylamide, 2.5 parts (1% by mole) of ammonium salt of hydroxypropyl methacrylate sulfuric acid ester and 50.5 parts (29% by mole) of 2-ethylhexyl acrylate were used as unsaturated monomers.

EXAMPLE 1

(Preparation of emulsion sizing agent)

In 200 parts of toluene were dissolved 50 parts of the fortified rosin obtained in Reference Example 1 and 50 parts of the rosin ester obtained in Reference Example 2, and then, these were mixed with 60 parts of the aqueous solution of the copolymer (dispersing agent) obtained in Reference Example 6 and 285 parts of warm water (60° C. ), and after they were emulsified by using a high-pressure emulsifier, toluene was distilled away and a 40% emulsion sizing agent was prepared.

EXAMPLES 2 to 4 and COMPARATIVE EXAMPLES 1 to 5

In Example 1, emulsion sizing agents were prepared in the same manner as in Example 1 except that the kinds of the rosin substances or the copolymers (dispersing agents) were changed to those shown in Table 1.

EXAMPLE 5

To 160° C. were heated and melted 70 parts of the fortified rosin obtained in Reference Example 1 and 30 parts of the rosin ester obtained in Reference Example 4, and thereto was added 150 parts of the copolymer obtained in Reference Example 10 over 1 hour with stirring. Hot water was gradually added to the obtained water-in-oil type emulsion with stirring to generate phase inversion, and oil-in-water type emulsion was prepared and further it was diluted with hot water, so that a 50% emulsion sizing agent was prepared.

EXAMPLES 6 to 7 and COMPARATIVE EXAMPLE 6

In Example 5, emulsion sizing agents were prepared in the same manner as in Example 5 except that the kinds of the rosin substances or the copolymers (dispersing agents) were changed to those shown in Table 1.

TABLE 1

| Ex. No. | Kinds and amount of rosin substance (parts) | Ester content (%) | Kinds of dispersing agent |
|---|---|---|---|
| 1 | Reference Ex. 1 (50) + Reference Ex. 2 (50) | 50 | Reference Ex. 6 |
| 2 | Reference Ex. 1 (30) + Reference Ex. 2 (70) | 70 | Reference Ex. 7 |
| 3 | Reference Ex. 1 (40) + Reference Ex. 3 (60) | 60 | Reference Ex. 8 |
| 4 | Reference Ex. 1 (60) + Reference Ex. 3 (40) | 40 | Reference Ex. 9 |
| 5 | Reference Ex. 1 (70) + Reference Ex. 4 (30) | 30 | Reference Ex. 10 |
| 6 | Reference Ex. 1 (50) + Reference Ex. 5 (50) | 30 | Reference Ex. 11 |
| 7 | Reference Ex. 3 (50) + Reference Ex. 5 (50) | 80 | Reference Ex. 12 |
| Com. Ex. | | | |
| 1 | Reference Ex. 1 (100) | 0 | Reference Ex. 6 |
| 2 | Reference Ex. 1 (95) + Reference Ex. 2 (5) | 5 | Reference Ex. 7 |
| 3 | Reference Ex. 1 (60) + Reference Ex. 2 (40) | 40 | Reference Ex. 13 |
| 4 | Reference Ex. 1 (40) + Reference Ex. 3 (60) | 60 | Reference Ex. 14 |
| 5 | Reference Ex. 1 (30) + Reference Ex. 4 (70) | 70 | Reference Ex. 15 |
| 6 | Reference Ex. 1 (50) + Reference Ex. 5 (50) | 30 | Reference Ex. 16 |

Mechanical stability, dilution stability in hard water and aggregation property of the emulsion sizing agents obtained in Examples 1 to 7 and Comparative Examples 1 to 6 were measured according to the following methods. The results are shown in Table 2.

(1) Mechanical stability

To a vessel of Maron type stability tester (made by SHINSEI SANGYO Kabushiki Kaisha) was weighed out 50 g of the emulsion sizing agent, and after mechanical shear was supplied therefor at a temperature of 25° C. under a load of 10 kg at a rotational speed of 1000 rpm for 5 minutes, the resultant aggregate was filtered out through a 200 mesh metallic net, and the mechanical stability was calculated according to the following equation.

$$\text{Mechanical stability (\%)} = \frac{\text{(Absolute dry weight of aggregate/Absolute dry weight of emulsion sizing agent sample)}}{} \times 100$$

(2) Dilution stability in hard water

The emulsion sizing agent was diluted with hard water having a hardness of 100° DH to the concentration of 5%, and the dispersing condition was observed. The criteria for evaluation are as follows:

○: Dispersed

Δ: Partially aggregated

X: Aggregated (3) Aggregation property

To city water maintained at 40° C. were added alum and cationized starch (Oji Ace K-100, made by Oji Corn Starch Kabushiki Kaisha) so as to have a concentration of 0.01% and 0.005%, respectively, and after 0.01% of the emulsion sizing agent was added thereto, they were uniformly diffused.. At this stage, the pH was 4. This liquid was adjusted to pH 7 with sodium hydroxide and after it was stirred for 5 minutes, the aggregating condition of the emulsion was observed. The criteria for evaluation are as follows:

○: Dispersed
Δ: Partially aggregated
X: Aggregated

TABLE 2

| Ex. No. | Mechanical stability (%) | Dilution stability in hard water | Aggregation property |
|---|---|---|---|
| 1 | 0.1 | ○ | ○ |
| 2 | 0.1 | ○ | ○ |
| 3 | 0.1 | ○ | ○ |
| 4 | 0.1 | ○ | ○ |
| 5 | 0.1 | ○ | ○ |
| 6 | 0.1 | ○ | ○ |
| 7 | 0.1 | ○ | ○ |
| Com. Ex. | | | |
| 1 | 0.1 | Δ | Δ |
| 2 | 0.1 | Δ | Δ |
| 3 | 0.2 | x | x |
| 4 | 0.3 | x | Δ |
| 5 | 0.5 | Δ | x |
| 6 | 0.4 | ○ | x |

Next, in Practical Test 1, Practical Test 2 and Practical Test 3, sizing degree (second) of manufactured paper during the use of the emulsion sizing agents obtained in Examples 1 to 7 and Comparative Examples 1 to 6 to sizing agents for paper making was measured on the basis of a Stöckigt method (JIS P 8122). The results are in Table 3.

Practical Test 1

Pulp (L-BKP/N-BKP=2/1) which was subjected to a beating operation to a Canadian Standard Freeness of 400 ml was adjusted to 2% aqueous slurry, and it was maintained at 40° C. Next, after to the slurry were successively added 10% for the pulp (absolute dry weight basis) of calcium carbonate, 1.0% for the pulp (absolute dry weight basis) of alum, 0.5% for the pulp (absolute dry weight basis) of cationized starch (Oji Ace K-100, made by Oji Corn Starch Kabushiki Kaisha) and 0.2% or 0.5% for the pulp (absolute dry weight basis) of the emulsion sizing agent, the resultant slurry was diluted to the concentration of 1%. The pH of the resultant pulp slurry was 7.5. After this was uniformly diffused, it was subjected to paper making by using a TAPPI Standard Sheet Machine so as to have a basis weight of 60±1 g/m². This was dehydrated under a pressure of 5 kg/cm² for 5 minutes, and then, it was dried by means of a drum drier at 100° C. for 1 minute, and further, after this paper was subjected to the adjustment of humidity under the condition of at 20° C. and a relative humidity of 65% for 24 hours, the sizing degree (second) was measured.

Practical Test 2

Pulp (waste newspaper, containing 3% of calcium carbonate) having a beating degree of 300 ml was adjusted to 2% aqueous slurry, and it was maintained at 50° C. Thereto were successively added 1.0% for the pulp (absolute dry weight basis) of alum and 0.3% for the pulp (absolute dry weight basis) of the emulsion sizing agent. Then, this slurry was diluted to the concentration of 1% and uniformly diffused. The pH of the resultant slurry was 7.5. The paper making was carried out in the same manner as in Practical Test 1, and the sizing degree (second) was measured.

Practical Test 3

In Practical Test 2, the paper making was carried out and the sizing degree (second) was measured in the same manner as in Practical Test 2 except that 0.3% for the pulp (absolute dry weight basis) of the emulsion sizing agent and 1.0% for the pulp (absolute dry weight basis) of alum were mixed together with just before the addition.

TABLE 3

| | Sizing degree (second) | | | |
|---|---|---|---|---|
| | Practical test 1 For pulp | | Practical test 2 For pulp | Practical test 3 For pulp |
| | 0.2% | 0.5% | 0.3% | 0.3% |
| Ex. No. | | | | |
| 1 | 28.8 | 38.2 | 28.0 | 32.1 |
| 2 | 29.8 | 38.8 | 29.1 | 34.1 |
| 3 | 28.5 | 38.1 | 27.8 | 33.3 |
| 4 | 27.8 | 37.6 | 27.1 | 32.0 |
| 5 | 29.1 | 38.4 | 28.9 | 34.0 |
| 6 | 27.4 | 36.8 | 27.0 | 32.5 |
| 7 | 28.6 | 38.1 | 27.9 | 32.9 |
| Com. Ex. | | | | |
| 1 | 16.9 | 22.5 | 12.7 | 12.8 |
| 2 | 17.3 | 24.8 | 13.6 | 13.3 |
| 3 | 20.3 | 27.0 | 19.5 | 10.1 |
| 4 | 21.0 | 27.3 | 20.4 | 12.7 |
| 5 | 19.9 | 26.6 | 18.1 | 10.0 |
| 6 | 24.8 | 32.6 | 25.7 | 14.1 |

EXAMPLE 8

(Preparation of emulsion sizing agent mixed with polyvalent metal salt)

To 100 parts (on a solid basis) of the 40% emulsion sizing agent obtained in Example 1 were added 50 parts (solid matter) of aluminum sulfate and water to give an emulsion sizing agent mixed with aluminum salt, having a solid matter content of emulsion sizing agent of 35% (on a solid basis).

EXAMPLES 9 to 14 and COMPARATIVE EXAMPLES 7 to 12

In Example 8, emulsion sizing agents mixed with aluminum salt, having a solid matter content of emulsion sizing agent shown in Table 4 (on a solid basis) were prepared in the same manner as in Example 8 except that the kinds of emulsion sizing agents and the amount of used aluminum sulfates were changed to those shown in Table 4.

TABLE 4

| Ex. No. | Emulsion sizing agent Kinds | Concentration (%) | Amount of solid matter (parts) | Amount of aluminum sulfate (parts) | Concentration of emulsion sizing agent mixed with aluminum salt (%) |
|---|---|---|---|---|---|
| 8 | Example 1 | 40 | 100 | 50 | 35 |
| 9 | Example 2 | 40 | 100 | 420 | 35 |
| 10 | Example 3 | 40 | 100 | 250 | 35 |
| 11 | Example 4 | 40 | 100 | 100 | 35 |
| 12 | Example 5 | 50 | 100 | 150 | 45 |
| 13 | Example 6 | 50 | 100 | 300 | 45 |
| 14 | Example 7 | 50 | 100 | 180 | 45 |
| Com. Ex. | | | | | |
| 7 | Comparative Example 1 | 40 | 100 | 100 | 35 |
| 8 | Comparative Example 2 | 40 | 100 | 100 | 35 |
| 9 | Comparative Example 3 | 40 | 100 | 100 | 35 |
| 10 | Comparative Example 4 | 40 | 100 | 100 | 35 |
| 11 | Comparative Example 5 | 40 | 100 | 100 | 35 |
| 12 | Comparative Example 6 | 50 | 100 | 100 | 45 |

Next, mechanical stability, dilution stability in hard water, aggregation property and mixing stability with aluminum salt of emulsion sizing agents mixed with aluminum salt, obtained in Examples 8 to 14 and Comparative Examples 7 to 12 were measured. Moreover, mechanical stability, dilution stability in hard water and aggregation property were measured on the basis of the same method as mentioned above, and mixing stability with aluminum salt was measured on the basis of the following method. The results are shown in Table 5.

(4) Mixing stability with aluminum salt

The change of state of emulsion of the emulsion sizing agents mixed with aluminum salt obtained in Examples 8 to 14 and Comparative Examples 7 to 12 just after the preparation or after allowing to stand at 30° C. for 1 month was observed. The criteria for evaluation are as follows:

o: Not changed
Δ: Partially aggregated
X: Aggregated

TABLE 5

| Ex. No. | Mechanical stability (%) | Dilution stability in hard water | Aggregation property | Mixing stability with aluminum salt Just after mixing | Mixing stability with aluminum salt After allowing to stand for 1 month |
|---|---|---|---|---|---|
| 8 | 0.1 | o | o | o | o |
| 9 | 0.1 | o | o | o | o |
| 10 | 0.1 | o | o | o | o |
| 11 | 0.1 | o | o | o | o |
| 12 | 0.1 | o | o | o | o |
| 13 | 0.1 | o | o | o | o |
| 14 | 0.1 | o | o | o | o |
| Com. Ex. | | | | | |
| 7 | 0.2 | Δ | Δ | Δ | Δ |
| 8 | 0.2 | Δ | Δ | Δ | Δ |
| 9 | 0.3 | x | x | x | x |
| 10 | 0.5 | x | Δ | Δ | x |
| 11 | 0.6 | Δ | x | x | x |
| 12 | 0.5 | Δ | x | x | x |

Next, in Practical Test 4, Practical Test 5 and Practical Test 6, sizing degree (second) of manufactured paper during the use of the emulsion sizing agents mixed with aluminum salt obtained in Examples 8 to 14 and Comparative Examples 7 to 12 as sizing agents for paper manufacture was measured on the basis of a Stöckigt method (JIS P 8122). The results are shown in Table 6.

Practical Test 4

In Practical Test 1, the paper making was carried out and the sizing degree (second) was measured in the same manner as in Practical Test 1 except that the emulsion sizing agents mixed with aluminum salt were used instead of the emulsion sizing agents (on condition that the content of pure emulsion sizing agent in the emulsion sizing agent mixed with aluminum salt was adjusted to the concentration of 0.2% or 0.5% for the pulp (absolute dry weight basis), and that the total amount of aluminum sulfate was adjusted to the concentration of 1.0% for the pulp (absolute dry weight basis) in consideration of the amount of the previously mixed aluminum sulfate).

Practical Test 5

In Practical Test 2, the paper making was carried out and the sizing degree (second) was measured in the same manner as in Practical Test 2 except that the emulsion sizing agents mixed with aluminum salt were used instead of the emulsion sizing agents (on condition that the content of pure emulsion sizing agent in the emulsion sizing agent mixed with aluminum salt was adjusted to the concentration of 0.3% for the pulp (absolute dry weight basis), and that the total amount of aluminum sulfate was adjusted to the concentration of 1.0% for the pulp (absolute dry weight basis) in consideration of the amount of the previously mixed aluminum sulfate).

Practical Test 6

In Practical Test 2, the paper making was carried out and the sizing degree (second) was measured in the same manner as in Practical Test 2 except that the emulsion sizing agents mixed with aluminum salt were used without adding alum thereto, instead of the emulsion sizing agents.

TABLE 6

| | Sizing degree (second) | | | |
|---|---|---|---|---|
| | Practical Test 3 For pulp | | Practical Test 4 For pulp | Practical Test 5 For pulp |
| | 0.2% | 0.5% | 0.3% | 0.3% |
| Ex. No. | | | | |
| 8 | 30.7 | 40.8 | 32.7 | 31.9 |
| 9 | 31.0 | 41.2 | 33.6 | 34.6 |
| 10 | 30.3 | 40.8 | 32.6 | 33.0 |
| 11 | 30.1 | 40.0 | 32.3 | 32.2 |
| 12 | 30.9 | 41.1 | 33.3 | 30.6 |
| 13 | 30.0 | 39.7 | 32.0 | 32.4 |
| 14 | 30.3 | 40.4 | 33.1 | 32.1 |
| Com. Ex. | | | | |
| 7 | 16.1 | 21.3 | 10.9 | 8.8 |
| 8 | 16.9 | 22.8 | 11.4 | 9.2 |
| 9 | 10.4 | 17.6 | 9.3 | 5.7 |
| 10 | 15.5 | 19.8 | 11.4 | 7.8 |
| 11 | 9.8 | 12.1 | 8.7 | 5.3 |
| 12 | 16.9 | 20.3 | 12.6 | 9.6 |

INDUSTRIAL APPLICABILITY

The rosin emulsion sizing agent for paper making of the present invention exhibits excellent sizing effect, in particular, excellent sizing effect in the neutral range. Also, the rosin emulsion sizing agent for paper making is excellent in mechanical stability and dilution stability in hard water, and is sufficiently capable of corresponding to the closing of a paper making system in recent years. In addition, because the rosin emulsion sizing agent for paper making shows low foaming property, workability during paper making is extremely improved when the method for paper sizing using the sizing agent of the present invention is employed.

Also, when the rosin emulsion sizing agent for paper making of the present invention, which is prepared by previously mixing a polyvalent metal salt therewith, is used, sizing effect can be more improved, and excellent sizing effect can be imparted to manufactured papers even in paper making system to which no fixing agents for sizing agents are added. Furthermore, because the above-mentioned rosin emulsion sizing agent for paper making is excellent in mixing stability with the polyvalent metal salt for a long period of time, there are generated advantages that chemicals added to a paper making system can be collectively administered and that it is convenient in handling when the method for paper sizing using the sizing agent of the present invention is employed.

We claim:

1. A rosin emulsion sizing agent for paper making comprising a rosin substance, a dispersing agent and water,
    said rosin substance comprising:
        (a) a rosin or a fortified rosin and (b) a rosin ester or a fortified rosin ester,
    said dispersing agent comprising: a (meth)acrylamide copolymer obtained by polymerizing a polymerizable monomer mixture containing:
        (A) 70 to 95% by mole of (meth)acrylamide,
        (B) 0.5 to 10% by mole of a sulfo (salt) group-containing monomer or a phosphoric acid (salt) group-containing monomer and
        (C) 1 to 20% by mole of a hydrophobic monomer, wherein the amount of said dispersing agent is 1 to 30 parts by weight, on a solid basis, based on 100 parts by weight of said rosin substance, said (meth) acrylamide copolymer dispersing agent having an average molecular weight between 1,000 to 200,000.

2. The rosin emulsion sizing agent for paper making of claim 1, wherein said polymerizable monomer mixture used for preparing the (meth)acrylamide copolymer which is a dispersing agent further contains (D) up to 5% by mole of a carboxyl (salt) group-containing monomer.

3. The rosin emulsion sizing agent for paper making of claim 1 or 2, wherein said polymerizable monomer mixture used for preparing the (meth)acrylamide copolymer which is a dispersing agent further contains (E) up to 20% by mole of a hydrophilic monomer other than (A) (meth)acrylamide.

4. The rosin emulsion sizing agent for paper making of claim 1, wherein said rosin substance contains 20 to 90% by weight of (b) a rosin ester or a fortified rosin ester.

5. The rosin emulsion sizing agent for paper making of claims 1 or 2 further comprising, up to 500 parts by weight of a polyvalent metal salt per 100 parts by weight of said rosin sizing agent.

6. The rosin emulsion sizing agent for paper making of claim 5, wherein said polyvalent metal salt is at least one member selected from aluminum sulfate, aluminum chloride, poly(aluminum hydroxide) and poly(aluminum chloride).

7. The rosin emulsion sizing agent for paper making of claim 3 further comprising, up to 500 parts by weight of a polyvalent metal salt per 100 parts by weight of said rosin sizing agent.

8. In a method for paper sizing wherein a sizing agent is added to an aqueous dispersion of pulp in a paper making system, the improvement comprising:
    adding to said aqueous dispersion of pulp at a range of pH of 6 to 8, an effective amount of a rosin emulsion sizing agent comprising a rosin substance, a dispersing agent and water, wherein the amount of said dispersing agent is 1 to 30 parts by weight, on a solid basis, based on 100 parts by weight of said rosin substance, said dispersing agent having an average molecular weight between 1,000 to 200,000;
    said rosin substance comprising (a) a rosin or a fortified rosin and (b) a rosin ester or a fortified rosin ester,
    said dispersing agent comprising a (meth)acrylamide copolymer obtained by polymerizing a polymerizable monomer mixture selected from the group consisting of:
        (i) a mixture of
            (A) 70 to 95% by mole of (meth)acrylamide,
            (B) 0.5 to 10% by mole of a sulfo (salt) group-containing monomer or a phosphoric acid (salt) group-containing monomer, and
            (C) 1 to 20% by mole of a hydrophobic monomer;
        (ii) a mixture of
            (A) 70 to 95% by mole of (meth)acrylamide,
            (B) 0.5 to 10% by mole of a sulfo (salt) group-containing monomer or a phosphoric acid (salt) group-containing monomer,
            (C) 1 to 20% by mole of a hydrophobic monomer, and
            (D) up to 5% by mole of a carboxyl (salt) group-containing monomer;
        iii) a mixture of
            (A) 70 to 95% by mole of (meth)acrylamide,
            (B) 0.5 to 10% by mole of a sulfo (salt) group-containing monomer or a phosphoric acid (salt) group-containing monomer, (C) 1 to 20% by mole of a hydrophobic monomer, and
(E) up to 20% by mole of a hydrophilic monomer other than (A) (meth)acrylamide; and
iv) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer,
(D) up to 5% by mole of a carboxyl (salt) group-containing monomer, and
(E) up to 20% by mole of a hydrophilic monomer other than (A) (meth)acrylamide.

9. In a method for paper sizing wherein a sizing agent is added to an aqueous dispersion of pulp in a paper making system, the improvement comprising:

mixing a rosin emulsion sizing agent for paper making comprising a rosin substance, a dispersing agent and water, said dispersing agent having an average molecular weight between 1,000 to 200,000, wherein the amount of said dispersing agent is 1 to 30 parts by weight, on a solid basis, based on 100 parts by weight of said rosin substance, with a polyvalent metal salt just before the addition to said paper making system, adding an effective amount of the mixture of said rosin emulsion sizing agent for paper making and said polyvalent metal salt to the paper making system at a pH range of 6 to 8;

said rosin substance comprising (a) a rosin or a fortified rosin and (b) a rosin ester or a fortified rosin ester, said dispersing agent comprising a (meth)acrylamide copolymer obtained by polymerizing a polymerizable monomer mixture selected from the group consisting of:
(i) a mixture of
(A) 70 to 95% by mole of (meth)acrylamide,
(B) 0.5 to 10% by mole of a sulfo (salt) group-containing monomer or a phosphoric acid (salt) group-containing monomer, and
(C) 1 to 20% by mole of a hydrophobic monomer;
(ii) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer, and
(D) up to 5% by mole of a carboxyl (salt) group-containing monomer;
iii) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer, and
(E) up to 20% by mole of a hydrophilic monomer other than (A) (meth)acrylamide; and
iv) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer,
(D) up to 5% by mole of a carboxyl (salt) group-containing monomer, and
(E) up to 20% by mole of a hydrophilic monomer other than (A) (meth)acrylamide.

10. In a method for paper sizing wherein a sizing agent is added to an aqueous dispersion of pulp in a paper making system, the improvement comprising:

adding an effective amount of a rosin emulsion sizing agent for paper making to said paper making system at a pH range between 6 to 8, said rosin emulsion sizing agent being prepared by mixing up to 500 parts by weight of a polyvalent metal salt, on a solid basis, with 100 parts by weight of solid matter a rosin emulsion sizing agent for paper making comprising a rosin substance, a dispersing agent and water, wherein the amount of said dispersing agent is 1 to 30 parts by weight, on a solid basis, based on 100 parts by weight of said rosin substance said dispersing agent having an average molecular weight between 1,000 to 200,000;

said rosin substance comprising (a) a rosin or a fortified rosin, and (b) a rosin ester or a fortified rosin ester, said dispersing agent comprising a (meth)acrylamide copolymer obtained by polymerizing a polymerizable monomer mixture selected from the group consisting of:
(i) a mixture of
(A) 70 to 95% by mole of (meth)acrylamide,
(B) 0.5 to 10% by mole of a sulfo (salt) group-containing monomer or a phosphoric acid (salt) group-containing monomer, and
(C) 1 to 20% by mole of a hydrophobic monomer;
ii) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer, and
(D) up to 5% by mole of a carboxyl (salt) group-containing monomer;
iii) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer, and
(E) up to 20% by mole of a hydrophilic monomer other than (A) (meth)acrylamide; and
iv) a mixture of
(A) 70 to 95% by mole of (meth)acrylamide,
(B) 0.5 to 10% by mole of a sulfo (salt) group-containing monomer or a phosphoric acid (salt) group-containing monomer,
(C) 1 to 20% by mole of a hydrophobic monomer,
(D) up to 5% by mole of a carboxyl (salt) group-containing monomer, and
(E) up to 20% by mole of a hydrophilic monomer other than (A) (meth)acrylamide.

* * * * *